United States Patent
Gurvich

(10) Patent No.: US 12,391,383 B2
(45) Date of Patent: Aug. 19, 2025

(54) AIRCRAFT LAVATORY SEAT WITH REDUCED RISK OF INJURIES

(71) Applicant: B/E Aerospace, Inc., Winston Salem, NC (US)

(72) Inventor: Mark R Gurvich, Middletown, CT (US)

(73) Assignee: B/E Aerospace Inc., Winston Salem, NC (US)

( * ) Notice: Subject to any disclaimer, the term of this patent is extended or adjusted under 35 U.S.C. 154(b) by 256 days.

(21) Appl. No.: 17/951,897

(22) Filed: Sep. 23, 2022

(65) Prior Publication Data

US 2024/0101256 A1 Mar. 28, 2024

(51) Int. Cl.
*B64D 11/02* (2006.01)

(52) U.S. Cl.
CPC .................... *B64D 11/02* (2013.01)

(58) Field of Classification Search
CPC ........ E03F 1/006; B61D 35/007; B64D 11/02
See application file for complete search history.

(56) References Cited

U.S. PATENT DOCUMENTS

| | | |
|---|---|---|
| 3,922,730 A | 12/1975 | Kemper |
| 3,995,328 A * | 12/1976 | Carolan ................. B64D 11/02 210/167.01 |
| 5,165,457 A | 11/1992 | Olin et al. |
| 5,421,040 A | 6/1995 | Oldfelt |
| 5,604,938 A | 2/1997 | Tyler |
| 6,385,789 B1 * | 5/2002 | Pondelick .............. B64D 11/04 4/431 |
| 6,393,635 B2 | 5/2002 | Rozenblatt |
| 7,566,355 B2 * | 7/2009 | Gaskins ................ F23L 11/005 55/DIG. 20 |
| 8,341,773 B2 | 1/2013 | Hoffjann et al. |
| 8,397,318 B2 * | 3/2013 | Seibt ..................... B64D 11/02 4/316 |
| 9,783,974 B1 | 10/2017 | Tillotson |
| 10,793,291 B2 | 10/2020 | Brown et al. |
| 2004/0083541 A1 * | 5/2004 | Ogren .................... E03D 9/052 4/213 |

FOREIGN PATENT DOCUMENTS

| | | |
|---|---|---|
| CN | 103615039 | 3/2014 |
| EP | 0436357 | 9/1994 |
| SE | 502453 | 10/1995 |

OTHER PUBLICATIONS

European Patent Office, European Search Report dated Jan. 11, 2024 in Application No. 23199208.2.

(Continued)

*Primary Examiner* — Erin Deery
(74) *Attorney, Agent, or Firm* — SNELL & WILMER L.L.P.

(57) ABSTRACT

A lavatory system includes a toilet having a front end, a back end, a top end, and a bottom end, and a tube having a first end coupled to the toilet toward the top end and a second end extending above the top end. The toilet includes a toilet bowl defined by the front end, the back end, the top end, and the bottom end, and a toilet seat coupled to the toilet bowl on the top end.

15 Claims, 6 Drawing Sheets

(56) References Cited

OTHER PUBLICATIONS

Hannah J. Parrish, "How Does An Airplane Vacuum Toilet System Work?", Good Home Time, https://goodhometime.com/Cleaning/Vacuum-Cleaners/airplane-vacuum-toilet/, Jul. 14, 2020, pp. 1-7.
NCBI ROFL, "Airplane vacuum toilets: an uncommon travel hazard.", Discover Magazine, https://www.discovermagazine.com/the-sciences/ncbi-rofl-airplane-vacuum-toilets-an-uncommon-travel-hazard, Jul. 28, 2011, pp. 1-6.
cnn.com, "Jet passenger's transatlantic toilet trauma", CNN.com/World, http://edition.cnn.com/2002/WORLD/europe/scandinavia/01/22/airplane.toilet/pages, Jan. 22, 2002, pp. 1-2.

* cited by examiner

AIRCRAFT LAVATORY SEAT WITH REDUCED RISK OF INJURIES

FIELD

The present disclosure relates to aircraft lavatory systems and methods and, more particularly, improved safety features for use in aircraft lavatories to reduce the risk of injuries.

BACKGROUND

Aircraft cabins include lavatories having vacuum-driven systems. The waste removing process in such a system may be based primarily on differences between ambient pressure and a generated vacuum. Accordingly, a strong suction with a toilet of the lavatory may be created due to the vacuum and thus creates a risk of injury. For instance, a person may be unable to remove themselves from the toilet due to the strong suction seal, which may result in bodily damage. Therefore, a modification to the vacuum-driven lavatories is desirable to reduce the risk of injuries.

SUMMARY

A lavatory system is disclosed herein. The lavatory system includes a toilet having a front end, a back end, a top end, and a bottom end, and a tube having a first end coupled to the toilet toward the top end and a second end extending above the top end. The toilet includes a toilet bowl defined by the front end, the back end, the top end, and the bottom end, and a toilet seat coupled to the toilet bowl on the top end.

In various embodiments, the tube is coupled to the toilet bowl such that the toilet bowl includes a hole configured to receive the tube.

In various embodiments, the tube is coupled to the toilet seat such that the toilet seat includes a hole configured to receive the tube.

In various embodiments, the tube is coupled to the toilet between the toilet bowl and the toilet seat such that the toilet seat includes an indent configured to receive the tube.

In various embodiments, the lavatory system further includes a cap configured to cover the second end of the tube. The cap is removably coupled to the second end of the tube such that the cap is configured to slide off the tube or be screwed off of the tube.

In various embodiments, the lavatory system further includes a cap configured to cover the second end of the tube. The cap is a film adhered to the second end of the tube such that the cap is configured to be punctured to allow air flow through the tube.

In various embodiments, the lavatory system further includes a cap configured to cover the second end of the tube. The cap is coupled to the tube via at least one cap attachment such that the second end of the tube is always open.

In various embodiments, the tube is coupled to the toilet at at least one of the front end, the back end, or the top end.

In various embodiments, the tube includes a first segment downstream a curve of the tube and a second segment upstream the curve. The first segment extends perpendicularly from the toilet and the second segment extends perpendicularly from the first segment.

In various embodiments, the toilet is disposed in a lavatory of an aircraft.

In another aspect, an aircraft is disclosed herein. The aircraft includes a toilet disposed in a lavatory, a tube, a waste tank, a fluid conduit, and a vacuum generator. The toilet includes a front end, a back end, a top end, and a bottom end, a toilet bowl defined by the front end, the back end, the top end, and the bottom end, and a toilet seat coupled to the toilet bowl on the top end. The tube has a first end coupled to the toilet toward the top end and a second end extending above the top end. The fluid conduit extends from the toilet bowl to the waste tank. The vacuum generator is operatively coupled to the waste tank such that the vacuum generator is configured to cause a waste removal process between the toilet bowl, the waste tank, and the fluid conduit.

In various embodiments, the tube is coupled to the toilet bowl such that the toilet bowl includes a hole configured to receive the tube.

In various embodiments, the tube is coupled to the toilet seat such that the toilet seat includes a hole configured to receive the tube.

In various embodiments, the tube is coupled to the toilet between the toilet bowl and the toilet seat such that the toilet seat includes an indent configured to receive the tube.

In various embodiments, the aircraft further includes a cap configured to cover the second end of the tube. The cap is removably coupled to the second end of the tube such that the cap is configured to slide off of the tube or be screwed off of the tube.

In various embodiments, the aircraft further includes a cap configured to cover the second end of the tube. The cap is a film adhered to the second end of the tube such that the cap is configured to be punctured to allow air flow through the tube.

In various embodiments, the aircraft further includes a cap configured to cover the second end of the tube. The cap is coupled to the tube via at least one cap attachment such that the second end of the tube is always open.

In various embodiments, the aircraft further includes a cap configured to cover the second end of the tube. The cap is coupled to a wall of the lavatory and positioned over the second end of the tube.

In various embodiments, the tube includes a first segment downstream a curve of the tube and a second segment upstream the curve. The first segment extends perpendicularly from the toilet and the second segment extends perpendicularly from the first segment.

In yet another aspect, a method of operating an aircraft lavatory system of a lavatory for an aircraft is disclosed herein. The method includes using the aircraft lavatory system, actuating a vacuum generator of the lavatory to initiate a waste removal process, removing a cap of the aircraft lavatory system in response to a vacuum seal created between a toilet of the aircraft lavatory system and a passenger using the aircraft lavatory system, and releasing the vacuum seal created. Removing the cap includes at least one of sliding, screwing, or puncturing the cap. Removing the cap allows ambient air to flow through the aircraft lavatory system.

The forgoing features and elements may be combined in various combinations without exclusivity, unless expressly indicated herein otherwise. These features and elements as well as the operation of the disclosed embodiments will become more apparent considering the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

Figure 1:
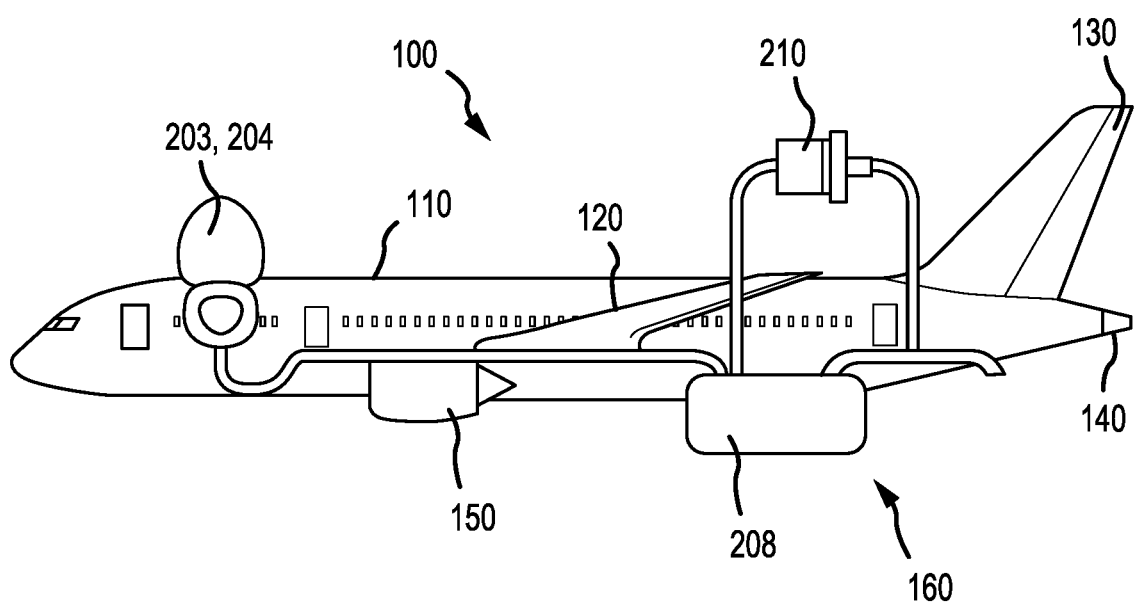
FIG. 1 illustrates an aircraft, in accordance with various embodiments.

The detailed description of exemplary embodiments herein refers to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Due to weight restrictions, traditional ground water-flush toilets are not practical for aircraft applications. Therefore, a commonly used solution is a vacuum-driven lavatory system, with the waste removing process being based primarily on differences between ambient pressure and a generated vacuum. However, in spite of the known advantages of the vacuum-driven lavatory systems, there are disadvantages associated with a risk of injury of an occupant, e.g., a passenger or a crew member. This risk is due to a created suction between a person and the toilet, making the person unable to remove himself from the toilet. For instance, when a passenger sits on a seat of a toilet of the vacuum-driven lavatory system and eliminates or reduces air gaps, the difference in ambient pressure in the surrounding area and the vacuum pressure may cause the passenger to be suctioned down into the seat cavity. The low pressure in the toilet bowl in comparison with the ambient pressure prevents the occupant from being removed from the toilet. Body damages and/or illnesses can result. Accordingly, as described herein, modifications of vacuum-driven lavatories eliminate, or tend to reduce, risks of such injuries.

Disclosed herein is a mechanism to reduce the pressure difference between the ambient pressure and the vacuum pressure, thus preventing or releasing suction created. For instance, the lavatory system described herein provides a flow of air with ambient pressure to the toilet cavity even if the cavity of a lavatory seat is completely covered by an occupant body (passenger, crew member, etc.). A hollow tube may be connected to the seat cavity via a hole at one end with an opening at an opposite end of the tube. Further, the system may include a cover on the end of the tube.

With such adjustments, among others, the conditions creating potential vacuum-driven suction of human body are eliminated while not affecting waste removing functions (e.g., flushing) in other "normal" conditions with this low-cost modification based on the already existing systems. Variants of locations, sizes, shapes, geometries, materials, connections, methods of making, etc. of such added parts can be designed according to specifics of considered aircraft and its lavatory system. Also, more than one added part can also be used if needed. Further, while described herein in the context of an aircraft, the disclosed lavatory system may be implemented in non-aircraft applications (e.g., trains, submarines, high-level floors in skyscraper buildings or towers, buildings in dry desert areas, etc., i.e., in cases with limited water supply).

Figure 2:
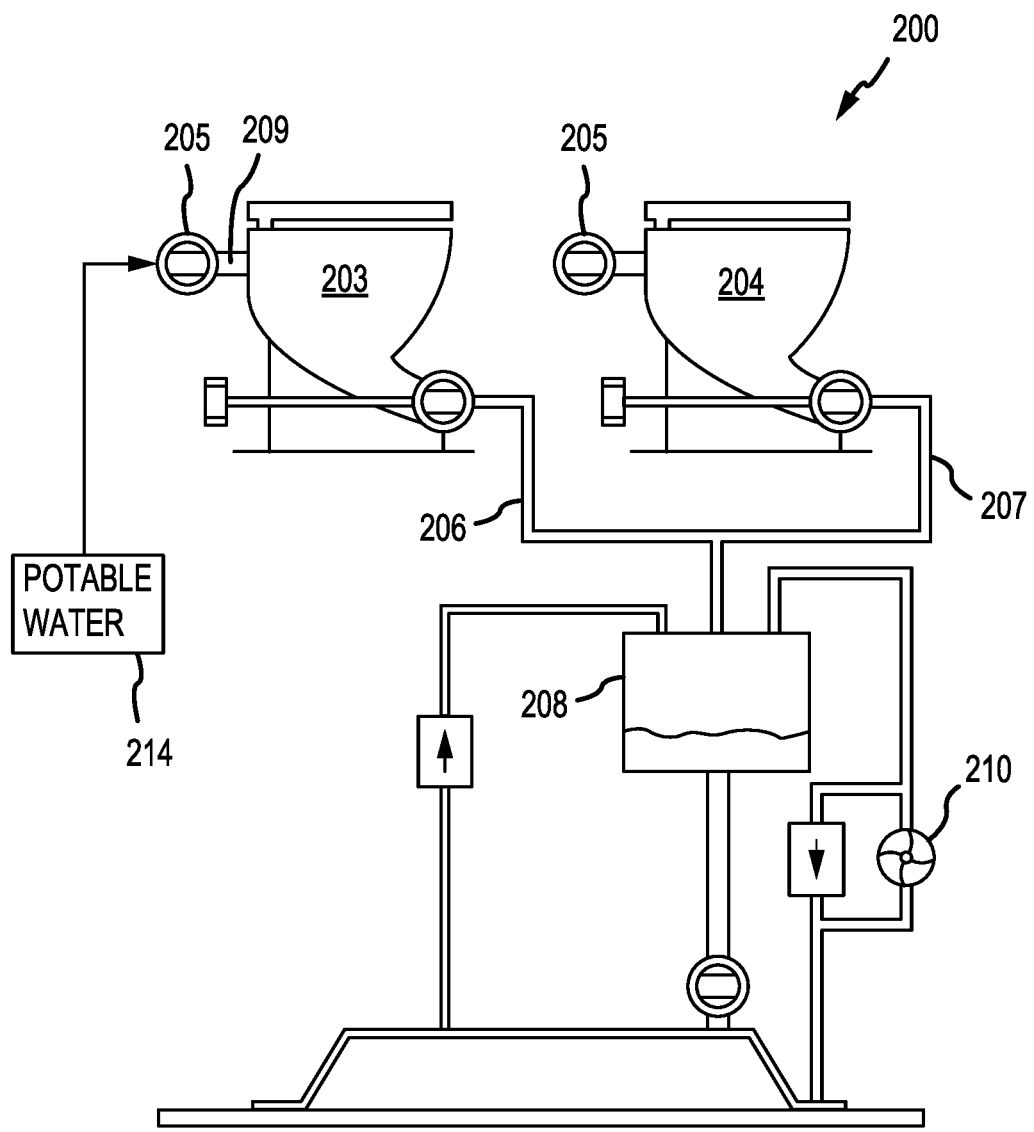
FIG. 2 illustrates a plumbing system of an aircraft, in accordance with various embodiments.

Referring now to FIGS. 1-2, a side view of an aircraft 100 is illustrated in accordance with various embodiments. The aircraft 100 comprises a fuselage 110, wings 120 extending outward from the fuselage 110, a vertical stabilizer 130, horizontal stabilizers 140 and engines 150. In various embodiments, fuselage 110 defines an aircraft cabin therein. In this regard, passengers may board the aircraft 100 and sit within the aircraft cabin during travels. The aircraft cabin includes at least one lavatory disposed therein. Aircraft 100 may have a potable water and wastewater system 160. As described in further detail below, an aircraft lavatory system 400 may be employed with one or more components of the potable water and wastewater system 160.

Referring now to FIG. 2, a plumbing system 200 is illustrated, in accordance with various embodiments. In various embodiments, the plumbing system 200 comprises a rinse valve 205 associated with each toilet bowl (e.g., toilet bowls 203, 204). The rinse valve 205 is configured to open in response to external activation (e.g., via flushing of a handle, via a sensor detecting a person is no longer in front of the sensor, or the like). In response to opening the rinse valve 205, waste water (e.g., potable water) may flow (e.g., via fluid conduits 209) from a potable water tank 214 to a toilet bowl 203 or toilet bowl 204. In various embodiments, during the flushing process, waste water may be dispensed through a fluid conduits 206, 207 from each toilet bowl (e.g., toilet bowls 203, 204) to the waste tank 208. In this regard, any solid waste may be transported from the toilet bowl (e.g., toilet bowl 203 or toilet bowl 204) to the waste tank 208 as waste water, in accordance with various embodiments. The plumbing system 200 may further include a vacuum generator 210. The vacuum generator 210 may include an actuator, motor, or other device or component which initiates a vacuum flush of a toilet within the laboratory. The vacuum generator 210 may be controlled to initiate or cease a flush operation.

Figure 3:
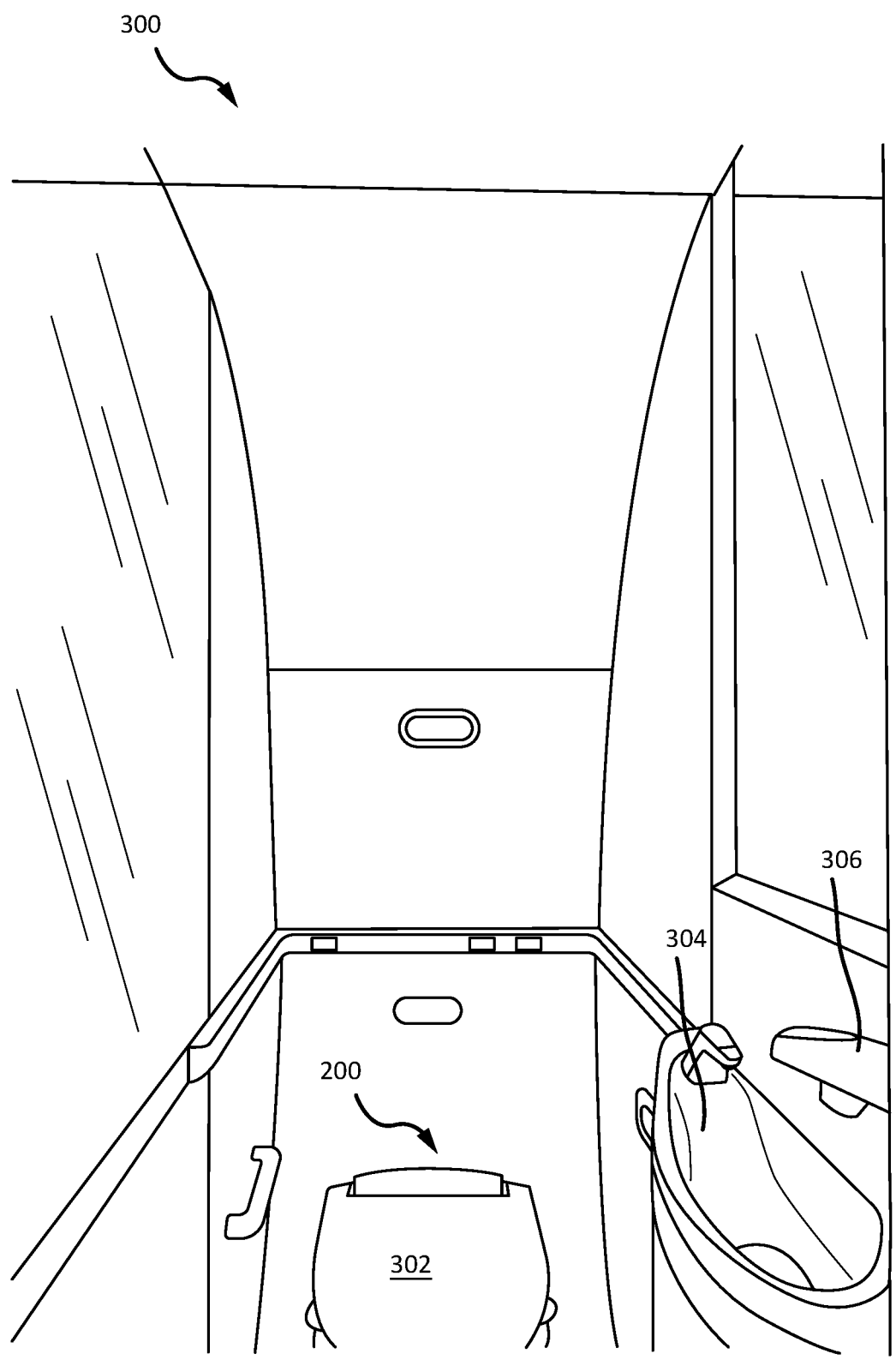
FIG. 3 illustrates a perspective view of a lavatory for an aircraft, in accordance with various embodiments.

Referring now to FIG. 3, a perspective view of a representative lavatory 300 of an aircraft is illustrated in accordance with various embodiments. The lavatory 300 comprises a toilet 302 (e.g., toilet bowl 203, toilet bowl 204), a water basin 304 (e.g., a sink), and a faucet 306. In various embodiments, the lavatory 300 further comprises the plumbing system 200. The plumbing system 200 is in fluid communication with at least the toilet 302. In this regard, in response to flushing the toilet 302, waste water may be transferred throughout the plumbing system 200. Similarly, in response to running water via the faucet 306, waste water may be transferred throughout the plumbing system 200.

Figure 4:
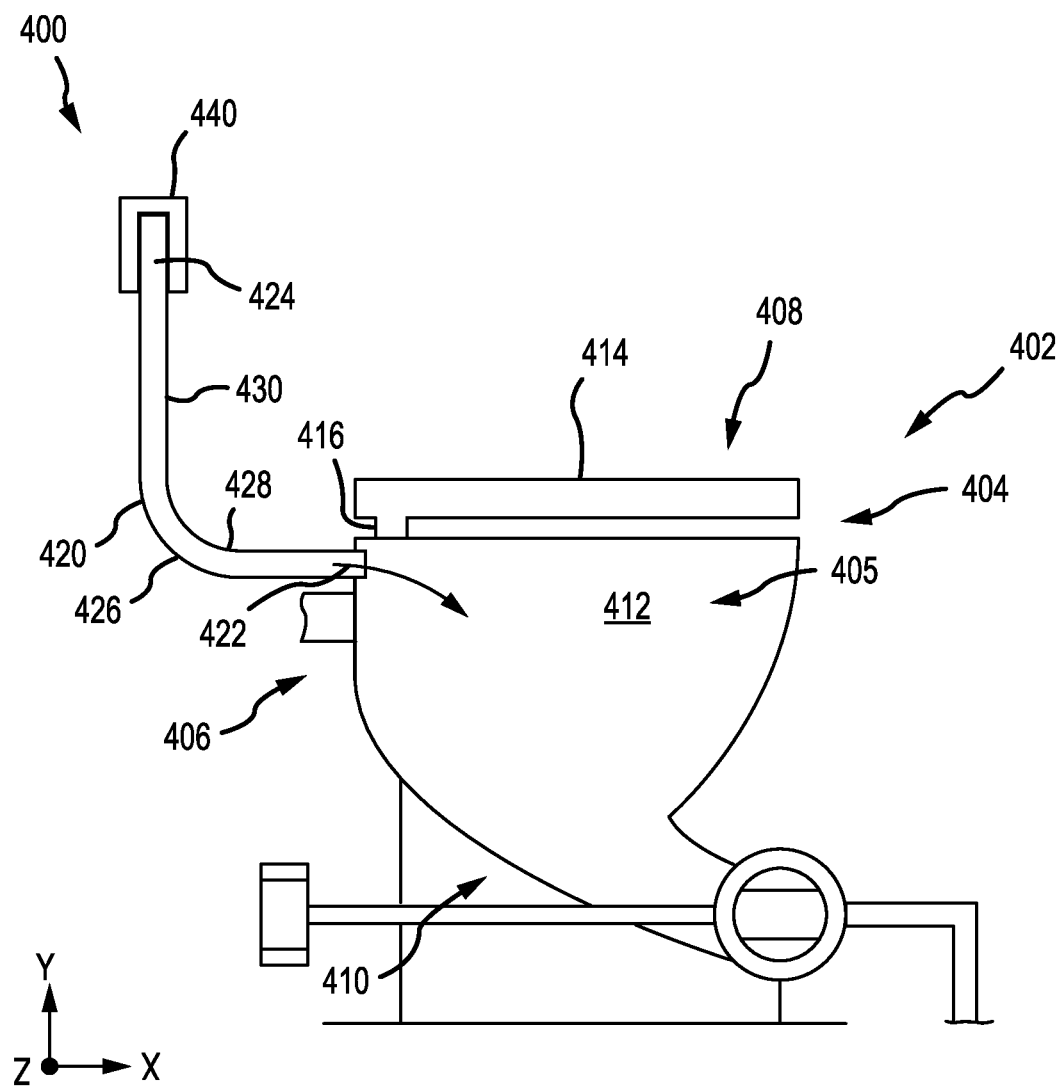
FIG. 4 illustrates a schematic cross-sectional view of an aircraft lavatory system, in accordance with various embodiments.
Figure 5:
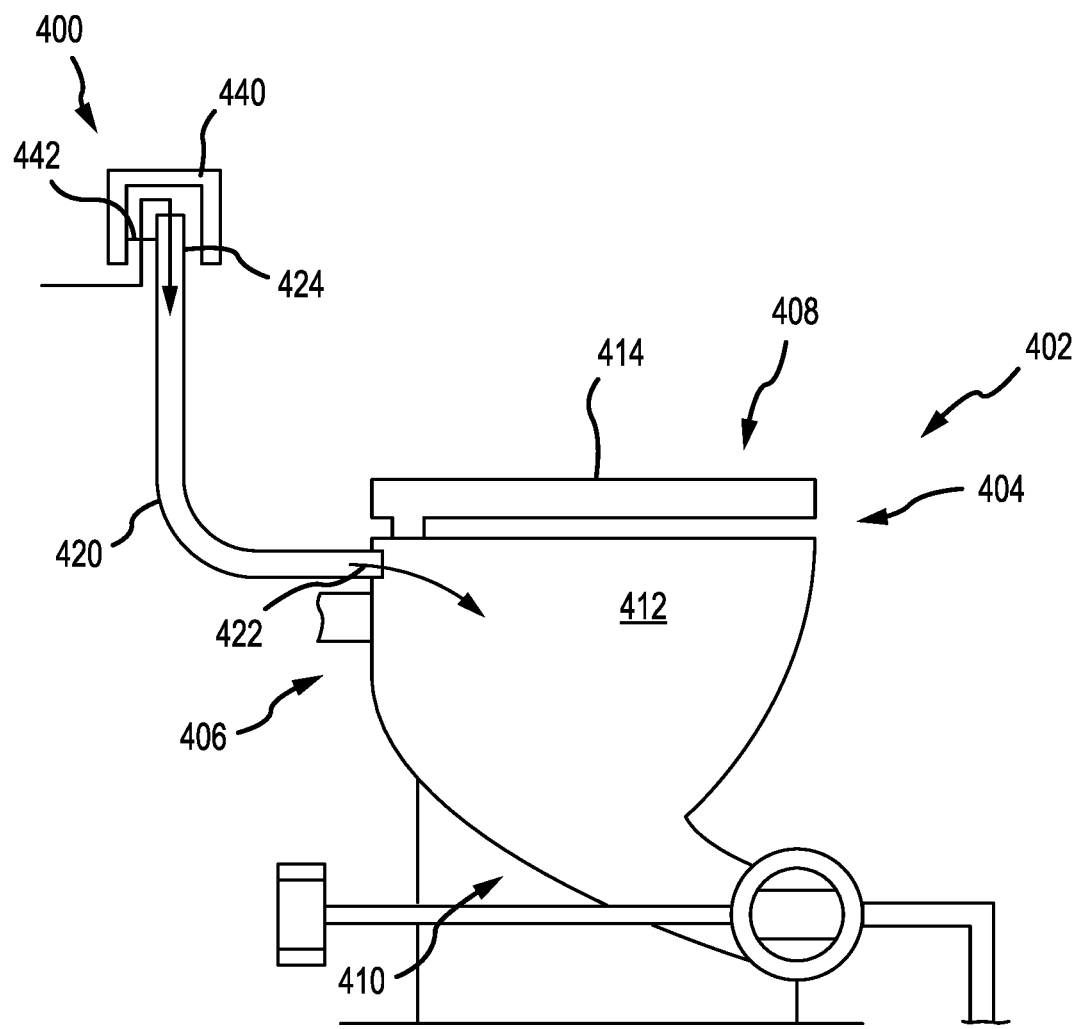
FIG. 5 illustrates a schematic cross-sectional view of an aircraft lavatory system, in accordance with various embodiments.

Referring now to FIGS. 4-5, an aircraft lavatory system 400 is illustrated in accordance with various embodiments. The aircraft lavatory system 400 includes a toilet 402 having a front end 404, a back end 406, a top end 408 and a bottom end 410. The front end 404 and the back end 406 may be opposite ends of the toilet 402 along an x-axis. The back end 406 may be a portion of the toilet 402 abutting a wall of the lavatory 300 where the front end 404 is accessible to the occupant. The top end 408 and the bottom end 410 may be opposite ends of the toilet 402 along a y-axis. The bottom end 410 may be a portion of the toile 402 abutting a floor of the lavatory 300 where the top end 408 is accessible to the occupant. The toilet 402 includes a toilet bowl 412 and a toilet seat 414. The toilet bowl 412 may be defined by the front end 404, the back end 406, the top end 408, and the bottom end 410 such that an opening, or a rim, of the toilet bowl 412 is adjacent to the top end 408 and a toilet cavity is defined by an inner surface of the toilet bowl. The toilet seat 414 may be coupled (e.g., hingedly coupled) to the toilet bowl 412 such that the toilet seat 414 is configured to rotate along a first plane above the toilet bowl 412 (e.g., a first plane parallel to the x-axis). For instance, the toilet seat 414 may be coupled to the toilet bowl 412 along the top end 408 via a hinge 416 located at the back end 406.

The aircraft lavatory system 400 includes a tube 420 having a first end 422 and a second end 424. The first end 422 is coupled to the back end 406 of the toilet 402. Particularly, the tube 420 is coupled toward the top end 408 of the toilet 402. Positioning the first end 422 near (e.g., toward, adjacent to, etc.) the top end 408, sanitary issues may be avoided (e.g., no waste should enter the tube). In various embodiments, the first end 422 is coupled to the front end 404 of the toilet 402. In various embodiments, the first end 422 is coupled anywhere in between, for instance, the tube 420 may be coupled to a side surface 405 (e.g., area between the front end 404 and the back end 406). In various embodiments, the first end 422 may be covered with a mesh where the tube 420 is connected to the toilet 402 to further prevent waste from getting into the tube 420. In various embodiments, the tube 420 may be coupled to the toilet bowl 412 (e.g., near the rim of the toilet bowl 412). For instance, the toilet bowl 412 may include a drilled hole from an outer surface of the toilet bowl 412 to the inner surface of the toilet bowl 412 configured to receive the tube 420. In various embodiments, the tube 420 may be coupled to the toilet seat 414. For instance, the toilet seat 414 may include a drilled hole from an outer surface of the toilet seat 414 to an inner surface of the toilet seat 414 configured to receive the tube 420. In various embodiments, the tube 420 may be received between the toilet bowl 412 and the toilet seat 414. For instance, the tube 420 may rest on the rim of the toilet bowl 412 below the toilet seat 414. The toilet seat 414 may include an indent configured to receive the tube 420.

The second end 424 of the tube 420 is configured to be an open end. Accordingly, ambient air can enter the tube 420 without any restriction and flow through the tube 420 into the toilet 402. Accordingly, even if the outer surfaces are completely sealed by the passenger, the vacuum effect caused by the difference between the ambient air and the low pressure within the toilet cavity of the toilet bowl 412 will be reduced toward the top end 408 due to the ambient air flow from the tube 420, thus allowing the passenger to not be suctioned into the toilet seat 414.

For representative examples shown in FIGS. 4-5, the tube 420 may include a curve 426 between the first end 422 and the second end 424. In other words, the tube 420 may be "L"-shaped. Accordingly, the tube 420 may include a first segment 428 downstream of the curve 426 and a second segment 430 upstream of the curve 426. The first segment 428 may extend perpendicularly from the toilet 402 (e.g., in the x-direction). The second segment 430 may extend perpendicularly from the first segment 428 in a direction opposite the bottom end 410 (e.g., in the y-direction, away from the bottom of the toilet bowl 412). The second segment 430 may extend above and beyond the toilet seat 414 such that the second end 424 remains unobstructed by the occupant. In various embodiments, the second segment 430 may extend perpendicularly from the first segment 428 in a same plane as the first segment 428 (e.g., the second segment 420 may extend perpendicularly from the second segment 428 in a y-direction). In other words, the "L"-shape may be completely or substantially horizontal (e.g., in an x-z plane), rather than partially vertical as shown (e.g., in an x-y plane). The tube 420 can be designed with various number of segments of different geometries each. The configuration and geometry of the tube 420 can be optimized due to the available space in the lavatory 300, while the second end 424 remains above the top end 408 and the second end 424 remains above the first end 422.

In various embodiments, the aircraft lavatory system 400 may include a covering component in a form of a cap 440. The cap 440 may be configured to prevent dirt from entering the tube 420 and/or prevent passengers from dropping items into the tube 420 that may cause a blockage. The cap 440 may be configured to, at least, partially cover the second end 424 of the tube 420. The cap 440 may be configured to be removably coupled to the second end 424. The cap 440 may be easily removed in a case of emergency by an occupant (passenger, crew member, etc.) using any of the implemented solutions (removing by sliding, removing by screwing, penetration/puncturing, etc.). For instance, in various embodiments, the cap 440 may be a lid configured to screw onto a threaded surface of the tube 420. The cap 440 may be configured to be unscrewed by an occupant when needed (e.g., the vacuum created the suction/seal of the passenger and the toilet 402). In various embodiments, the cap 440 may be a lid configured to slide onto the tube 420. The cap 440 may be configured to be lifted off by the occupant when needed. In various embodiments, the cap 440 may be a film (e.g., plastic, paper, etc.) adhered to the second end 424. For instance, the cap 440 may be configured to be punctured by the occupant when needed. The cap 440 may have different appropriate design implementations with respect to their topologies, geometries and materials (e.g., polymeric, composite, metallic).

Referring to FIG. 5, in various embodiments, the cap 440 may be configured to permanently allow the ambient air to constantly flow into the toilet 402. Accordingly, the aircraft lavatory system 400 may include at least one cap attachment 442. For instance, the at least one cap attachment 442 may be configured to couple the cap 440 to the tube 420 while leaving gaps between the cap 440 and the tube 420 to allow air to flow between the cap 440 and the tube 420. In various embodiments, the cap 440 may be coupled to a wall of the lavatory 300 and positioned over the second end 424 of the tube 420. In such a configuration, the passenger need not operate the aircraft lavatory system 400 when needed as the ambient air will always be flowing into the toilet 402 and eliminating the suction from the vacuum (e.g., the vacuum generator 210).

In various embodiments, the aircraft lavatory system 400 may include a sign with instructions indicating how to operate the aircraft lavatory system 400. For instance, the sign may be coupled to the wall of the lavatory such that the passenger can view the sign when positioned on the toilet 402. The sign may indicate whether the user need to remove the cap 440 by sliding, removing by screwing, penetration/puncture, etc.

Figure 6:
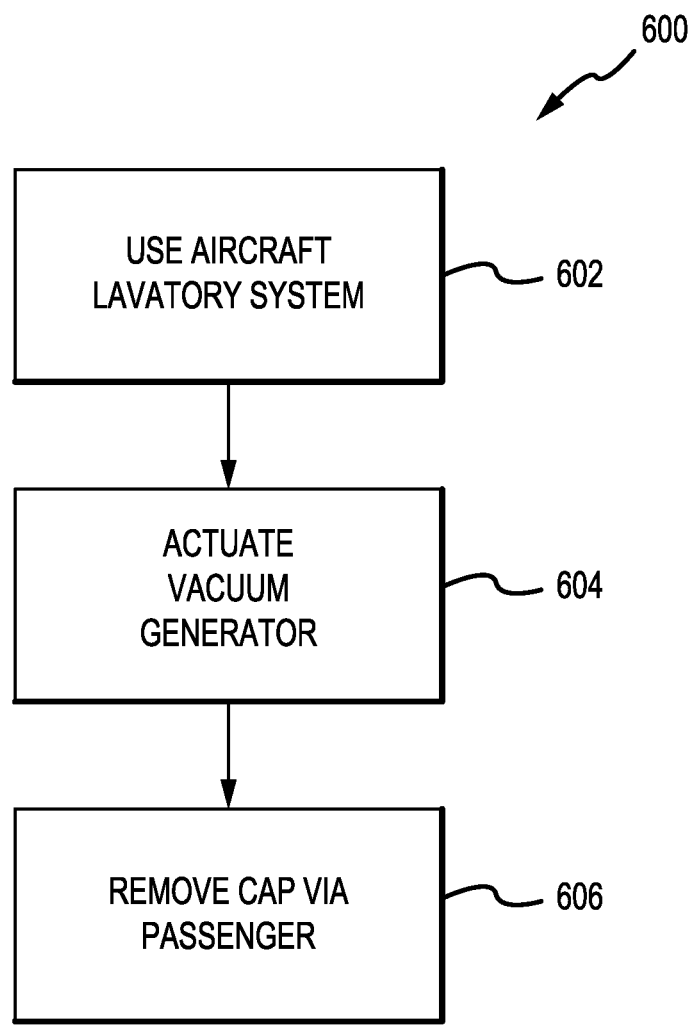
FIG. 6 illustrates a method of operating an aircraft lavatory system, in accordance with various embodiments.

Referring now to FIG. 6, a method 600 of operating an aircraft lavatory system is illustrated. At 602, the aircraft lavatory system may be used in a lavatory for an aircraft by a passenger. For instance, the lavatory may include a toilet upon which the passenger may sit. At 604, a vacuum generator of the lavatory may be actuated to initiate a waste removal process. Accordingly, the passenger may be suctioned into the toilet due to the vacuum seal created between the passenger and the toilet. At 606, a cap may be removed by the passenger in an emergency situation (e.g., the vacuum generator caused a suction effect on the passenger sitting on the toilet). For instance, the cap may be removed by sliding, removing by screwing, puncturing a film, etc. Accordingly, when the cap is removed, ambient air may flow through the aircraft lavatory system thus releasing the suction pressure between the passenger and the toilet.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A lavatory system, comprising:
   a toilet having a front end, a back end, a top end, and a bottom end, the toilet comprising:
      a toilet bowl defined by the front end, the back end, the top end, and the bottom end; and
      a toilet seat coupled to the toilet bowl on the top end;
   a tube having a first end coupled to the toilet toward the top end and a second end extending above the top end; and
   and a closure configured to cover the second end of the tube, wherein the closure is accessible to an occupant of the lavatory system, wherein the closure is at least one of a cap or a film, and wherein the closure is removably coupled to the second end of the tube such that the closure is configured to at least one of translate away from the tube, unscrew from the tube, or be punctured.

2. The lavatory system of claim 1, wherein the tube is coupled to the toilet bowl such that the toilet bowl includes a hole configured to receive the tube.

3. The lavatory system of claim 1, wherein the tube is coupled to the toilet seat such that the toilet seat includes a hole configured to receive the tube.

4. The lavatory system of claim 1, wherein the tube is coupled to the toilet between the toilet bowl and the toilet seat such that the toilet seat includes an indent configured to receive the tube.

5. The lavatory system of claim 1, wherein the tube is coupled to the toilet at at least one of the front end, the back end, or the top end.

6. The lavatory system of claim 1, wherein the tube comprises a first segment downstream a curve of the tube and a second segment upstream the curve, the first segment extending perpendicularly from the toilet and the second segment extending perpendicularly from the first segment.

7. The lavatory system of claim 1, wherein the toilet is disposed in a lavatory of an aircraft.

8. The lavatory system of claim 1, wherein the tube is coupled to the toilet on a side surface of the toilet.

9. An aircraft, comprising:
   a toilet disposed in a lavatory, the toilet comprising:
      a front end, a back end, a top end, and a bottom end;
      a toilet bowl defined by the front end, the back end, the top end, and the bottom end; and
      a toilet seat coupled to the toilet bowl on the top end;
   a tube having a first end coupled to the toilet toward the top end and a second end extending above the top end;
   a closure configured to cover the second end of the tube, wherein the closure is accessible to an occupant of the lavatory, wherein the closure is at least one of a cap or a film, and wherein the closure is removably coupled to the second end of the tube such that the closure is configured to at least one of translate away from the tube, unscrew from the tube, or be punctured;

a waste tank;

a fluid conduit extending from the toilet bowl to the waste tank; and a vacuum generator operatively coupled to the waste tank such that the vacuum generator is configured to cause a waste removal process between the toilet bowl, the waste tank, and the fluid conduit.

10. The aircraft of claim 9, wherein the tube is coupled to the toilet bowl such that the toilet bowl includes a hole configured to receive the tube.

11. The aircraft of claim 9, wherein the tube is coupled to the toilet seat such that the toilet seat includes a hole configured to receive the tube.

12. The aircraft of claim 9, wherein the tube is coupled to the toilet between the toilet bowl and the toilet seat such that the toilet seat includes an indent configured to receive the tube.

13. The aircraft of claim 9, wherein the tube comprises a first segment downstream a curve of the tube and a second segment upstream the curve, the first segment extending perpendicularly from the toilet and the second segment extending perpendicularly from the first segment.

14. The aircraft of claim 9, wherein the tube is coupled to the toilet on a side surface of the toilet.

15. A method of operating an aircraft lavatory system of a lavatory for an aircraft, the method comprising:

using the aircraft lavatory system, the aircraft lavatory system comprising:

a toilet comprising:

a front end, a back end, a top end, and a bottom end;

a toilet bowl defined by the front end, the back end, the top end, and the bottom end, and a toilet seat coupled to the toilet bowl on the top end;

a tube having a first end coupled to the toilet toward the top end and a second end extending above the top end, and a closure configured to cover the second end of the tube, wherein the closure is accessible to an occupant of the lavatory, wherein the closure is at least one of a cap or a film, actuating a vacuum generator of the lavatory to initiate a waste removal process;

removing the closure of the aircraft lavatory system in response to a vacuum seal created between the toilet of the aircraft lavatory system and a passenger using the aircraft lavatory system, wherein removing the closure includes at least one of sliding, screwing, or puncturing the closure; and releasing the vacuum seal created, wherein removing the cap allows ambient air to flow through the aircraft lavatory system.

* * * * *